United States Patent [19]

Reinert

[11] 4,324,231
[45] Apr. 13, 1982

[54] SOLAR COLLECTOR PANELS HAVING COATED FIBROUS FILLING FOR FIRE INHIBITION

[75] Inventor: Charles P. Reinert, Garvin, Minn.
[73] Assignee: Solarein, Inc., Buffalo, Minn.
[21] Appl. No.: 98,062
[22] Filed: Nov. 28, 1979
[51] Int. Cl.³ ............................................... F24J 3/02
[52] U.S. Cl. ................................... 126/449; 126/417; 126/429
[58] Field of Search ............... 126/449, 432, 417, 428, 126/429; 252/606, 608, 609; 428/920, 921, 378, 913

[56] References Cited

U.S. PATENT DOCUMENTS

| | | | |
|---|---|---|---|
| 3,284,216 | 11/1966 | Kaplan | 252/606 X |
| 3,875,925 | 4/1975 | Johnston | 126/449 X |
| 4,061,579 | 12/1977 | Sawko et al. | 252/606 |
| 4,119,083 | 10/1978 | Heyen et al. | 126/449 |
| 4,198,328 | 4/1980 | Bertelli et al. | 252/606 X |
| 4,212,292 | 7/1980 | Reinert | 126/429 X |

OTHER PUBLICATIONS

Solarmat Collector Core, (Product Bulletin #101), Solarein, Inc., P.O. Box 318, Buffalo, Minnesota 55313.

Primary Examiner—Larry Jones
Attorney, Agent, or Firm—Kinney, Lange, Braddock, Westman and Fairbairn

[57] ABSTRACT

Solar collector panels filled with porous fiber mats have the fibers coated with a pigmented intumescent paint which expands to partially fill the spaces between the fibers for retarding convective fluid flow through the fiber mat in the case of a fire in the structure with which the collector is associated.

2 Claims, 4 Drawing Figures

SOLAR COLLECTOR PANELS HAVING COATED FIBROUS FILLING FOR FIRE INHIBITION

BACKGROUND OF THE INVENTION

1. Field of the Invention

The present invention relates to fiber filled solar collectors wherein the fibers are coated with a coating for retarding convective flow in the case of a fire.

2. Prior Art

Various intumescent paints have been known in the prior art, and the expansion of such paint when subjected to heat has been known. The paint acts as an insulator. Also, the fact that intumescent paint inherently has lower combustibility than ordinary paint has been known.

In the prior art there have been various solar collector panels used to collect radiant energy, and which are filled with fibrous materials. For example, my own U.S. patent application Ser. No. 958,352, filed Nov. 6, 1978, now U.S. Pat. No. 4,212,292 for SOLAR COLLECTOR shows a very porous fiber solar mat that is used as a solar energy collector. The fiber mat has sufficient porosity so that radiant energy will penetrate deeply into the mat, and when the mat is placed upright along a stud wall, the solar energy penetrates substantially throughout the mat.

Additionally, the use of paint to decorate or provide graphic illustration on solar collector mats is shown in my copending application Ser. No. 874,199, filed Feb. 1, 1978 for a SOLAR COLLECTOR.

Another solar energy absorbing body and collector utilizing a fibrous type collecting mat having energy absorbing surfaces with a random array of interstices is shown in U.S. Pat. No. 4,119,083, issued Oct. 10, 1978 to Heyen et al. The fibers utilized with the mat shown in the Heyen patent are coated with thermo setting synthetic resins in which highly absorptive fine particles are mixed. However, no mention is made of fire hazards from the "chimney effect" of an upright collector. Heyen et al. does state that the filament, after coating, is fire retardant.

With very fibrous mats such as those used in the solar collectors disclosed herein and in my prior applications, substantially all of the fibers can receive a coating of paint, and thus a sufficient amount of the coating can be placed on the fibers so that substantial portions of the surfaces of all of the fibers are coated.

SUMMARY OF THE INVENTION

A solar collector having a fibrous mat filler and through which fluid is circulated for transferring heat to the fluid for use in various heating applications. The fiber mats have a large amount of surface area for a given volume. While the space between adjacent fibers is not excessive, there is a substantial amount of total interstitial space between the fibers to desirably keep the pressure head low for circulation. Substantial surface areas of the fibers substantially along the entire effecive length of the mat or collector are coated with an intumescent paint coating, which is pigmented if desired. When subjected to high temperatures, such as in a fire, the coating expands and creates an insulating sheath about each fiber and tends to fill the interstitial spaces between adjacent fibers. This provides the result of physically reducing and blocking the circulation of hot gases within the chamber of the collector due to the physical expansion of the intumescent paint on exposure to high temperature. A "chimney" effect within the collector is thus effectively reduced to a level which causes no substantial additional fire hazards.

The coating of intumescent paint will work with many types of fibers and with other collector elements where the individual elements are relatively closely spaced, although the preferred form of the invention discloses glass fibers arranged in a mat which is positioned between the studs of a vertical wall. The collector mat of this type provides insulation, and when it is in a stud wall the consequences of a fire and the resulting chimney effect in a loose mat fiber can be a problem. Examples of mats used for solar collectors which can provide advantages by the inhibition of passage of fluid through the mat in a fire include mats of the type shown in U.S. Pat. No. 3,875,925, issued Apr. 9, 1975 to John G. Johnston, and mats of the type shown in U.S. Pat. No. 3,102,532 also can be advantageously coated with intumescent paint in accordance with the teaching of the present invention.

The coatings of the fibers of a solar energy collector mat with an intumescent paint comprises a method of reducing the fire hazard by restricting the chimney effect through the coating of substantial surface portions of the fibers with intumescent paint to effectively restrict air flow through the interstitial spaces in the collection mat.

DESCRIPTION OF THE PREFERRED EMBODIMENT

Figure 1:
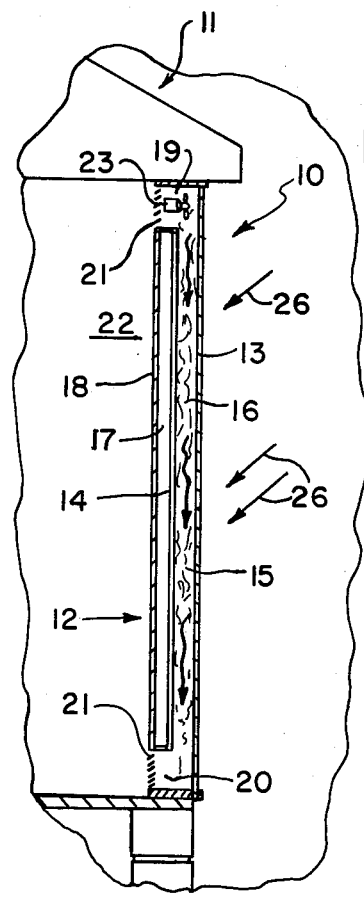
FIG. 1 is a cross sectional view of a portion of a dwelling house wall incorporating a solar collector containing the porous heat absorber mat having fibers coated in accordance with the present invention.

Referring first to FIG. 1 for a general orientation indicating a typical use of a solar mat constructed in accordance with the present invention, the solar collector assembly illustrated in cross section generally at 10 is mounted into an upright wall 12 of a house 11 and is adapted to receive solar energy to serve as a heating source. Specifically, the solar collector 10 is a plate type collector and includes a light transmissive panel or member which comprises a flat, fluid impervious, light transmissive plate 13 formed of glass or other suitable light transmissive, impervious material through which solar energy may pass. The solar collector 10 also includes a rear wall member 14 which is positioned adjacent and parallel to, but spaced from the light transmissive panel 13. A chamber 15 is thus formed between the two panels. The wall 14 is fluid impervious as well.

The chamber 15 is filled with a porous heat absorber mat indicated at 16, which substantially fills the chamber. The heat absorber is formed of a fibrous material which has high solar absorption and thermal insulation properties. Typically, the mat will be made of individual glass fibers which form an open mat of adjacent, spaced fibers providing a high total amount of interstitial space, and thus under ordinary circumstances, the pressure drop for air flow through the fibrous mat is very low. The density of the mat is such that the solar energy tends to penetrate inwardly into the mat toward the panel 14.

Other fibers such as steel wool, plastics and the like may also be used. As the fibers absorb solar energy, they change the energy into heat. The heat is transferred to the air or fluid flowing through the chamber 15. In the preferred embodiment, the solar collector may be secured to wall studs 17 of the wall 12 and is desired additional insulation can be provided. The collector mat 16 provides some insulation and thus is positioned between the studs as well.

The collector as shown is vertically oriented, and has an inlet opening 19 adjacent the top, and as shown also is provided with an outlet opening 20 adjacent the bottom. The collector mat itself extends between studs 17 which studs define the width of the chamber 15. The openings 19 and 20 may extend the full width of the solar collector and if desired, suitable filters or grill work indicated at 21 can be utilized. A fan 23 is positioned as shown to direct air through the inlet opening 19, and downwardly and longitudinally through the interstitial spaces of the mat 16 and into the interior space 22 of the building. The studs 17 also support an interior wall 18.

Figure 2:
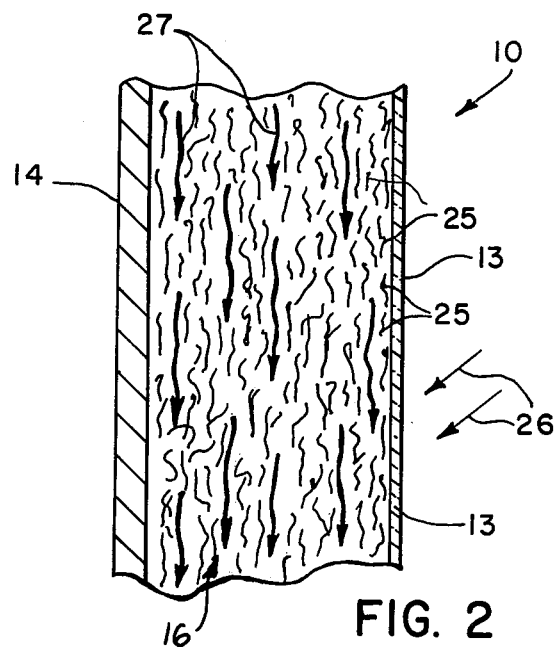
FIG. 2 is a greatly enlarged sectional view of a portion of the mat showing the random orientation of the fibers comprising the mat.

In FIG. 2, the enlarged section illustrates the individual fibers shown at 25, which are randomly oriented, and when individual fibers are provided as shown, solar energy rays indicated at 26 entering the collector through the transmissive panel 13 are absorbed by the fibers and converted into heat. Because of the loose orientation of the fibers, radiant energy will penetrate through the outer layers of the mat a substantial distance, and as indicated by the arrows 27, the air flows through the interstitial spaces of the fibers, and heat is transferred to the air. Because a low head of pressure is desirable for normal circulation through the mat, it means that in the case of a fire, the chimney effect would be greatly enhanced in a vertically oriented mat because of its porosity and the vertically spaced openings 19 and 20.

Figure 3:
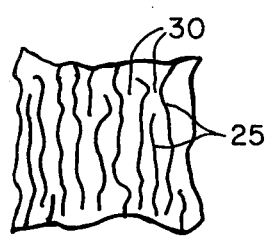
FIG. 3 is a greatly enlarged part schematic view of typical fibers oriented in a mat, and coated with an intumescent coating according to the present invention prior to expansion.
Figure 4:
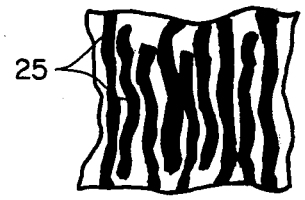
FIG. 4 is a representation of a portion of a solar mat similar to that shown in FIG. 3 and illustrating the effect of intumescent coating on reduction of interstitial spaces between fibers of the solar mat.

FIGS. 3 and 4 are part schematic representations of the arrangement of fibers 25 to provide for interstitial spaced indicated at 30, when placed in a mat. Even though the fibers such as glass fibers, in such a mat may not themselves be combustible, pigments that are used to coat them usually are combustible. More importantly, the fiber mats have a tremendous surface area, and where coated with a combustible coating, the surface area may lead to very rapid combustion, in a similar manner to combustion in a grain dust fire. Further, if the mat should melt or burn away, it can expose the structure to a very rapid spread of fire since the gases and fire could then spread right up the stud wall, for example from the lower portions of a room up into the roof area or from a first to a second floor, if the solar mat is used in a two story building.

It also should be apparent that when the light transmissive cover 13 is on the vertical surface of the building, it will be exposed to view and thus the mat behind the cover 13 will be seen. It is therefore desirable for aesthetic purposes to coat the fibers with a pleasing color and perhaps even graphic illustrations. While at the present time many mats are coated with a dark color or dark pigment paints, other colors also can be utilized with the solar collectors.

In the present invention, after the mats have been formed, and before the solar collector is closed, the fibers are coated with an intumescent paint, that is a paint which expands when exposed to fire and elevated temperatures and which can be appropriately tinted with a pigment sufficiently dark for good solar radiation collection. The paint is commercially available, and while it generally comes in a very light color or white color it can be pigmented for the present use if desired. One source of the paint is Fire-Tect, Inc., Los Angeles, California 90063. In testing, their paint number WT-102, Fire Retardant Vinyl Latex Paint has been found to possess the desired characteristics for use with solar collector mats described herein.

In FIG. 3, in particular, the spacing of the fibers 25 has been emphasized, and this provides for interstitial space 30 between the fibers. The fibers are adjacent and because the mat is substantially uniform in density, no large gaps are present. The fibers 25 as shown in FIG. 3 have been coated with a thin coating of an intumescent paint. The paint layer does not substantially change the effective cross sectional dimensions of the fibers. This means the spaces 30 individually are only a fraction of the total distance between the plates or walls 13 and 14. FIG. 4 illustrates the effect of fire, or a temperature high enough to cause the intumescent paint to swell. As the paint swells, the effective thickness of each of the fibers 25 increases substantially, and the size of the interstitial spaces 30 between adjacent fibers reduces substantially. A fiber thickness increases perhaps several times the original thickness without changing the fiber position. The convective air flow through the chamber 15 is substantially restricted and blocked. The intumescent coating on each individual fiber swells to block up the space or openings between the individual fibers with an insulating and air flow blocking material.

When ordinary paint is used for fiber coating the fibers may quickly melt on exposure to flame leaving an open passageway in the collector chamber 15. Such open space allows flame to quickly spread through the collector enhancing the fire danger to the structure, particularly when the mat is used as a part of a stud wall.

The application of the intumescent paint generally is done with a paint sprayer so that each of the fibers is coated to a substantial degree, and substantially all of the fibers throughout the chamber are coated. Substantial surface coating is important so that if a fire occurs and the intumescent paint expands, there will be sufficient coating expansion to retard the convective flow of chimney effect.

While intumescent paint is known to swell on application of fire to form a partially insulating barrier on the surface of the material which is coated with the paint, the additional factor of reducing the chimney effect in the solar mat disclosed greatly reduces the possibility of collapsing or melting of the fibers would occur to leave an open passageway for the heat and the gases to travel.

Thus in the present method, the reduction of fire hazard is achieved by providing a solar collector mat having an air passage formed through interstitial spaces of a fibrous mat, coating the fibers with an intumescent paint so that substantial portions of the surfaces of the fibers are coated along substantially the entire length of the mat with a sufficient coating so that upon being subjected to fire the swelling of the intumescent coating effectively restricts passage of air to substantially reduce the effective size of the passageways for air through the mat and thus restrict convective air flow. The fibers are positioned fairly close together so the change in size of the fibers blocks spaces between individual fibers.

The fibers are individual absorber elements that fill chamber 15 and are spaced from each other sufficiently to permit air flow through the chamber from the inlet to the outlet. The surface area of the fibers is several times the area of the collector plate 13 or of the flat area facing the source of radiation. This large surface area of the fibers mean that the volume of paint on the fibers is sufficient to provide effective blocking of air flow space when it expands.

What is claimed:

1. A solar heat collector formed of a low density porous mat of fibers which are adapted to absorb radiant energy when placed into a chamber, and are spaced sufficiently to permit flow of fluid through the mat, and said heat collector including means forming a chamber containing said mat and having a fluid inlet and a fluid outlet wherein said chamber is oriented so that the inlet and the outlet are vertically spaced from each other and which are spaced from each other to permit fluid flow through the spaces in the mat from the inlet to the outlet, and a coating of intumescent paint on substantial surfaces of the fibers along substantial portions of the entire length of the chamber between the inlet and the outlet, said coating being applied in a quantity to be effective to constrict the spaces between the individual fibers upon being subjected to elevated temperatures such as in a fire, and to substantially increase resistance to air flow between the inlet and outlet by blocking the spaces between individual fibers.

2. The combination as specified in claim 1 wherein the surface area of said fibers is substantially greater than the area of the collector through which radiant energy is transmitted to the fibers.

* * * * *